US008629371B2

(12) United States Patent
Oberste-Berghaus et al.

(10) Patent No.: US 8,629,371 B2
(45) Date of Patent: Jan. 14, 2014

(54) METHOD AND APPARATUS FOR FINE PARTICLE LIQUID SUSPENSION FEED FOR THERMAL SPRAY SYSTEM AND COATINGS FORMED THEREFROM

(75) Inventors: Jörg Oberste-Berghaus, Oudenaarde (BE); Salim Bouaricha, Annaba (DZ); Jean-Gabriel Legoux, Repentigny (CA); Christian Moreau, Boucherville (CA); Bernard Harvey, Ste-Julie (CA)

(73) Assignee: National Research Council of Canada, Ottawa, Ontario (CA)

( * ) Notice: Subject to any disclaimer, the term of this patent is extended or adjusted under 35 U.S.C. 154(b) by 2201 days.

(21) Appl. No.: 11/410,046

(22) Filed: Apr. 25, 2006

(65) Prior Publication Data

US 2006/0289405 A1 Dec. 28, 2006

Related U.S. Application Data

(60) Provisional application No. 60/676,300, filed on May 2, 2005.

(51) Int. Cl.
*B23K 9/00* (2006.01)
(52) U.S. Cl.
USPC .................................. 219/121.47; 219/121.48
(58) Field of Classification Search
USPC ............... 219/121.47, 121.46, 121.48, 121.5, 219/76.16, 75, 76.11; 118/47, 302; 427/452, 446, 447, 453, 455, 456; 239/81–85
See application file for complete search history.

(56) References Cited

U.S. PATENT DOCUMENTS

| 4,199,104 A | * | 4/1980 | Houben .......................... 239/81 |
| 4,982,067 A | | 1/1991 | Marantz et al. |
| 5,008,511 A | | 4/1991 | Ross |
| 5,225,652 A | | 7/1993 | Landes |
| 5,556,558 A | | 9/1996 | Ross et al. |
| 5,609,921 A | * | 3/1997 | Gitzhofer et al. ............. 427/446 |
| 6,334,977 B1 | * | 1/2002 | Matsui et al. ................... 420/70 |
| 6,447,848 B1 | | 9/2002 | Chow et al. |
| 6,491,967 B1 | | 12/2002 | Corderman et al. |
| 6,579,573 B2 | | 6/2003 | Strutt et al. |

(Continued)

FOREIGN PATENT DOCUMENTS

JP 04059618 A * 2/1992

OTHER PUBLICATIONS

Process Welding System, Inc., "Restore and Protect Worn Parts with Plasma Arc Welding Powder-Feed Solutions", Sep. 25, 2003, http://pwsweld.com,pp. 2-3.*

(Continued)

*Primary Examiner* — Quang Van
(74) *Attorney, Agent, or Firm* — TraskBritt, P.C.

(57) ABSTRACT

A method and apparatus by which liquid feedstock suspensions containing fine particles, micron- and nano-sized, are injected, with sufficient droplet velocity, preferably axially, into a plume of a thermal spray apparatus for the production of high-quality nanostructured coatings allows complete entrainment of the droplets in the plume, while the injection orifice remains potentially blockage-free for long periods of operation. The method and apparatus permit delivery at a low flow rate and with sufficient velocity to permit effective deposition, while reducing obstructions for a suspension feedstock delivery system and permits suspension feedstock to be controlled and delivered with reduced sensitivity of the spray process on the injection conditions to enable production of nanostructured coatings.

22 Claims, 4 Drawing Sheets

(56) References Cited

U.S. PATENT DOCUMENTS

| | | | |
|---|---|---|---|
| 6,669,106 B2 | 12/2003 | Delcea | |
| 6,723,387 B1* | 4/2004 | Kear et al. | 427/450 |
| 2004/0015269 A1* | 1/2004 | Jungmann et al. | 700/283 |
| 2004/0115466 A1* | 6/2004 | Ogawa et al. | 428/633 |

OTHER PUBLICATIONS

Siegert et al., "Denser Ceramic Coatings obtained by the Optimization of the Suspension Plasma Spraying Technique," International Thermal Spray Conference and Exposition, May 11, 2004.

Ma et al., "Study of Unique Microstucture in SPS Ceramic Nanocoatings," Thermal Spray 2003: Advancing the Science & Applying the Technology, 2003, pp. 1471-1476.

Karthikeyan et al., "Nanomaterial Deposits Formed by DC Plasma Spraying of Liquid Feedstocks," J. Am. Ceram. Soc., 1998, pp. 121-128, vol. 81, No. 1.

Jordan et al., "Superior Thermal Barrier Coatings Using Solution Precursor Plasma Spray," Journal of Thermal Spray Technology, Mar. 2004, pp. 57-65, vol. 13, No. 1.

Fazilleau et al., "Influence of Substrate Temperature of Formation of Micrometric Splats Obtained by Plasma Spraying Liquid Suspension," Thermal Spray 2003: Advancing the Science & Applying the Technology, 2003, pp. 889-893.

Fauchais, P., "Understanding plasma spraying," J. Phys. D: Appl. Phys., 2004, pp. R86-R108, vol. 37.

Delbos et al., "Finely structured ceramic coatings elaborated by liquid suspension injection in a DC plasma jet," International Thermal Spray Conference and Exposition, May 10, 2004.

Bouyer et al., "Suspension Plasma Spraying for Hydroxyapatite Powder Preparation by RF Plasma," IEEE Transactions on Plasma Science, Oct. 1997, pp. 1066-1072, vol. 25, No. 5.

Blazdell et al., "Plasma spraying of submicron ceramic suspensions using a continuous ink jet printer," Surface and Coating Technology, 2000, pp. 239-246, vol. 123.

Wittmann et al., "Control of the Injection of an Alumina Suspension Containing Nanograins in a dc Plasma," Thermal Spray 2001: New Surfaces for a New Millenium, 2001, pp. 375-381.

* cited by examiner

METHOD AND APPARATUS FOR FINE PARTICLE LIQUID SUSPENSION FEED FOR THERMAL SPRAY SYSTEM AND COATINGS FORMED THEREFROM

CROSS-REFERENCE TO RELATED APPLICATIONS

This application claims the benefit of U.S. patent application 60/676,300 filed May 2, 2005, which is herein incorporated by reference in its entirety.

FIELD OF THE INVENTION

The invention is in the field of thermal spray coatings. More particularly, the invention relates to plasma spraying of fine particle suspensions, with a low flow rate and a high ejection velocity, avoiding problems of obstruction.

BACKGROUND OF THE IVNETION

The art of air plasma spraying (APS) involves applying material to a surface in an ambient atmosphere. One known limitation of conventional plasma spraying techniques, is that they are limited to using large feedstock powders (10-100 µm). Consequently techniques for suspending finer powders (e.g. nano-scale dimension powders) in a liquid carrier have been developed to permit feeding and spraying of much finer particles. Unlike to the very small individual particles, the liquid suspension droplets possess sufficient momentum to enter the plasma stream. The plasma-liquid interaction atomizes the nano-sized powder suspension into a fine mist and evaporates the liquid suspension medium inside the flame, thereby concentrating the solid content into micron-sized or even smaller particles. At impact on the substrate, these particles form thinner lamellar than in conventional plasma spraying. Due to the finer lamellar structure, the formation of thin (50-10 µm or less) thermal spray coatings is possible. Nanostructured coatings can be formed with this technique, as rapid solidification of the small impinging droplets restricts their grain growth. As is well known to those familiar with the art, certain mechanical and physical properties of materials exhibit remarkable improvements as their grain size is reduced to the nanometer range.

In the art of suspension thermal spray coating, it is known to use a DC torch at atmospheric pressure. In such embodiments a liquid feed system is typically provided to inject droplets radially into a plasma flame of the torch. To ensure effective heat and momentum transfer from the plasma to the droplets of the suspension, high droplet jet velocities, and precise injection location and angle with respect to the central part of the plasma are critical. Experiments have revealed that the characteristics and properties of the resulting coatings are highly sensitive to these injection conditions. At the same time, the feed rate of the suspension is limited by the finite thermal loading capacity of the plasma, which not only has to melt the particles but also evaporate the entire liquid carrier. Generating high droplet velocities at a suitable feed rate requires small injection orifices, which are prone to obstructions by the solid content of the suspension. Injection instabilities, which frequently occur during partial and temporary obstructions, can divert the jet, leading to disruptions in the spray, and consequent loss of process efficiency. Complete obstructions terminate the spray process prematurely.

To avoid these problems research has been directed towards atomization of the liquid carrier, and to precursor technologies which do not use suspension delivery of the particles. With radial injection of an atomized liquid jet the heating and dispersion of the injected droplets is strongly dependent on, among other variables, the trajectory and size of the atomized droplets and, ultimately, the size distribution in the atomized plume. It will be evident to those skilled in the art that any droplets having too much or too little momentum will not be entrained in the plume, leaving a narrow band of droplet size and velocities suitable for effective delivery. Heat and momentum transfer to the carrier within the plasma is far more sensitive to droplet size and velocity and it is difficult to produce droplets in a narrow distribution of sizes and velocities. For example, U.S. Pat. No. 6,579,573 B3 to Strutt et al. discloses a method whereby nanoparticle liquid suspensions are used in conventional thermal spray deposition for the fabrication of high-quality nanostructured coatings, and the liquid is gas atomized prior to radial injection into the plasma flame.

For other reasons axial injection of feed in a plasma spray system has been developed. For example, U.S. Pat. No. 4,982,067 to Marantz et al relates to an apparatus to eliminate the long-standing problems with radial feed spray apparatus by designing a true axial feed in a plasma spay system. While most of this disclosure is to using particles as the feed, the patent also states that, "alternatively the feedstock may be liquid form, such as a solution, a slurry of a sol-gel fluid, such that the liquid carrier will be vaporized or reacted off, leaving a solid material to be deposited".

U.S. Pat. No. 5,609,921 to Gitzhofer discloses a suspension plasma spray where the material is supplied to the plasma discharge in the form of a suspension. The suspension is brought into the plasma discharge by an atomizing probe using a pressurized gas to shear the suspension, and thus atomize it into a stream of fine droplets. The atomizing probe also includes a cylindrical suspension injection tube. Between the injection tube and an inner tube (which encases the injection tube) is defined an annular chamber supplied with an atomizing gas. While most of the disclosure refers to a radio frequency induction torch spray system in a controlled pressure reactor chamber, the patent also states that the RF plasma torch could be replaced by a DC plasma torch.

U.S. Pat. No. 6,491,967 to Corderman relates to a plasma spray high throughput screening method and system for fabrication of thermal barrier coating. FIG. 3 of this patent shows a schematic of a gas atomizing injector for the liquid feedstock, where the liquid reactant is introduced in the center tube of two concentric tubes. FIG. 4 of this patent shows a version of the apparatus configuration for suitable DC APS torches, where this injector is installed internal to the torch. This patent essentially deals with solution precursor feeds, in which reactants (deposition material) are dissolved.

A publication in J. Am. Ceram. Soc. 81 [1] 212-28 (1998) to Kathikeyan et al. relates to nanomaterial deposits formed by dc plasma spraying of liquid precursor feedstocks. An internal gas-atomizer, consisting of multiple concentric tubes where the liquid is supplied in a central tube, injects the liquid feedstock axially into the center of four converging plasma flames.

There remains a need for a solution to the problem of obstructions of a small injection orifice, to deliver at a low flow rate and sufficient velocity, while reducing obstructions for a suspension feedstock delivery system. Furthermore an Air Plasma Spraying (APS) system is desired that permits suspension feedstock to be controlled and delivered with reduced sensitivity of the spray process on the injection conditions to enable production of nanostructured coatings.

SUMMARY OF THE INVENTION

The above discussed and other problems and deficiencies of the prior art are overcome or alleviated by the method and apparatus of the present invention, which provides a suspension feedstock injector for Air Plasma Spraying (APS) systems.

APS systems include plasma torches, a feedstock supply, and a part that is coated by deposition material carried in suspension by the feedstock supply. In APS systems the torch is exposed to ambient air, and not contained within a vacuum or artificial atmosphere. As such APS systems are more easily applied in manufacturing industries.

It is a further object of this invention to provide an injector with an internal configuration that provides substantially improved protection against obstructions by the solid content in the suspension.

In accordance with another embodiment of the invention, the feedstock supply chain is embodied by easily converting a commercially available convergent DC plasma torch system into a dual string delivery system.

In accordance with another embodiment of the invention, the feedstock supply chain injects the deposition material axially into a plume of a thermal spray. For example the thermal spray may be produced around a supply orifice or a plurality of plumes may converge onto a delivered jet of the suspension. Advantages of this include an improved heat and momentum transfer from the plasma to the liquid suspension feedstock as axial injection propelled by a gas and a constriction at the orifice of the feedstock supply accelerates the suspension in a direction of the plasma. Furthermore since the plasma envelops the suspension droplets are fully entrained by the plasma stream, with much less sensitivity to size and velocity distributions of the suspension.

Using such an embodiment, the particle trajectories, velocities and thermal histories, as well as the resulting coating characteristics are less sensitive to the injection conditions, resulting in a more reliable and robust spraying apparatus useful for nanostructured coatings.

Accordingly a gas propelling injector is provided, which forces the suspension liquid in an annular flow through an orifice that jointly ejects a propellant defining a gas core, which constricts the flow of the suspension liquid, causing acceleration during exit of the orifice. The suspension feedstock is preferably axially injected as an annular sheath into the center of multiple converging plasma jets. As the feed supply is surrounded by the plasma jets, the droplets are fully entrained by the converging plasma.

Another aspect of the invention is a plasma spraying torch system, including a plasma spraying torch and suspension vessel, from which the suspension is delivered to the injector at a controlled flow rate and monitored by a precision flow meter, and then propelled (for example by forced air or other gas propellant) into the plasma at a controlled propellant flow rate. Such a plasma spraying torch system may be used for plasma spraying of nanostructured ceramic and cermet coatings on a substrate.

Another aspect of the invention is a method of injecting a fine powder suspension into a plasma for plasma spraying, the method comprising: supplying the fine powder suspension in a suspension supply tube, and providing a propellant in a propellant supply tube, the propellant supply tube being contained within the suspension supply tube, at least proximate an end of the propellant supply tube; mixing the propellant with the suspension; and propelling the mixture axially into a plasma flame of a plasma spray apparatus.

Another aspect of the invention is a method of injecting a fine powder suspension into a plasma for plasma spraying, the method comprising: supplying the fine powder suspension and a gas core in an orifice in a two-phase flow, with a propellant occupying the gas core, and the suspension occupying an annular sheath surrounding the gas core, the orifice and gas core constituting a restriction of cross-sectional area for the liquid suspension whereby the suspension is accelerated for ejection into a plume of a thermal spray whereby the suspension is ejected and the orifice is extremely unlikely to be blocked. To provide this the orifice may be fed by an inner tube for the propellant supply, and an outer annular tube surrounding the inner tube, for the suspension supply.

BRIEF DESCRIPTION OF THE DRAWINGS

A better understanding of the invention is provided with the following detailed description in conjunction with the following drawings.

DESCRIPTION OF THE PREFERRED EMBODIMENT

Figure 1:
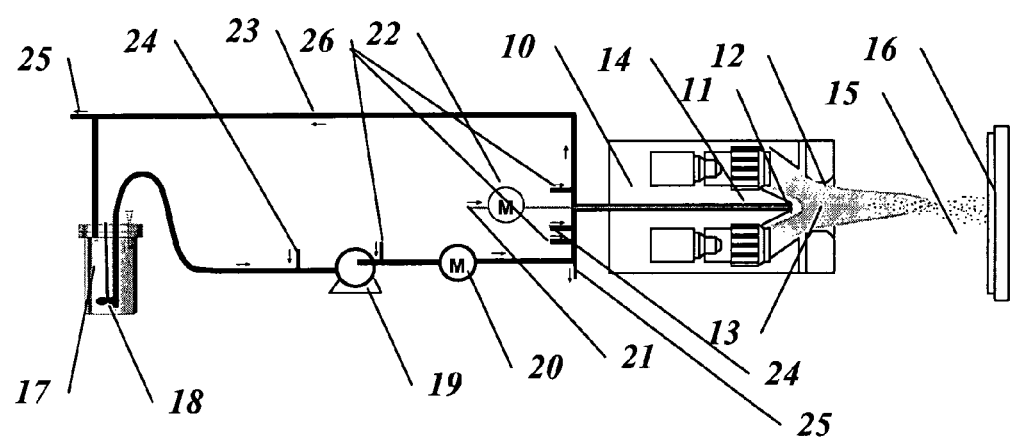
FIG. 1 is a schematic representation of the DC plasma spray apparatus in accordance with an embodiment of the invention.
Figure 2:
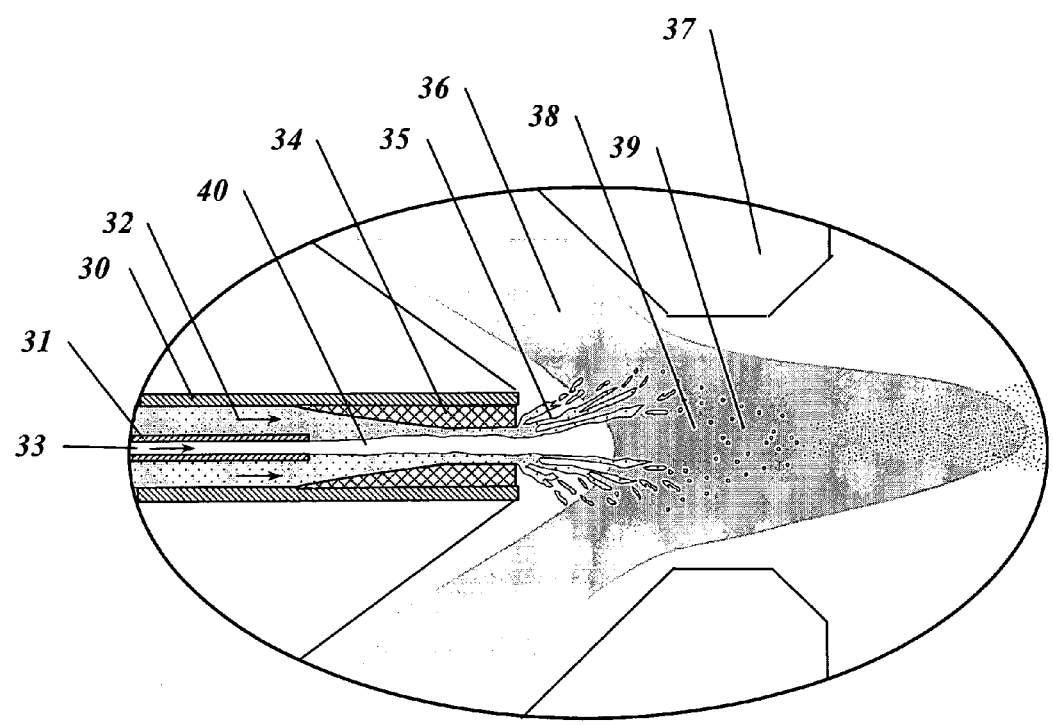
FIG. 2 is a schematic diagram of a two-phase flow of an injector of a plasma spray apparatus in accordance with the embodiment of FIG. 1.

Referring now to FIG. 1, in one embodiment of the DC-air plasma spraying (APS) apparatus and system of the present invention, is schematically illustrated. The design and equipment choice of the system is principally dedicated to deliver low dosages of a suspension to the spray apparatus at a precise rate, while minimizing solid sedimentation and buildup. The apparatus includes an APS torch 10, which produces three plasma streams 11 converging through a common exit nozzle 12. A commercially available example of a suitable plasma spraying torch is Model 600 Axial III Torch (Northwest Mettech Corp., Richmond BC, Canada) capable of generating high gas velocities and plasma temperatures. The suspension is supplied through an internal feeding tube 14, central to the plasma streams. The suspension is propelled into the plasma flame by a gas (i.e. a propellant), which is supplied through an internal concentric pipe inside the feeding tube 14. The suspension is atomized in the plasma, and the stream of resulting droplets travels through the plasma discharge 13. In the high temperature plasma, the suspension medium is evaporated, the vapors decompose, and the solid content of the suspension is concentrated into small particles 15, which are either totally of partially melted and/or vaporized. The plasma discharge 13 accelerates the molten droplets 15, which impact on the substrate 16 to form the coating of overlapping, flattened droplets.

In FIG. 1 the system also includes a suspension vessel 17, which is equipped with an agitator 18 to prevent sedimentation in the vessel and ensure homogeneity of the solid content. The suspension feed is charged to the spray torch 10 via a computer-controlled pump 20. A progressing-cavity positive-displacement pump is beneficial, since precise liquid flow rates can be delivered at a low dosage, free of pulsation and independent of the downstream pressure buildup, which may be caused by the plasma and atomizing gas backpressure or by injector constrictions. Furthermore, these pumps are resistant to the abrasion by the solid content of the suspension, and provide additional agitation during transport of the suspension. A suitable model is the NEMO®-Pump NM 005*6S (Netsch 119 Exton, Pa., USA).

The suspension flow rate to the spray torch 10 is continuously measured through a flow meter 19. A Coriolis type flow meter is beneficial, since it can measure the flow of non-conducting liquids, such as ceramics suspended in an organic solvent, and does not have any moving parts that could adversely be affected by the solid content of the suspension. Low flow rates can be precisely measured, independent of the density of the medium. The uninterrupted flow passage though the metering device reduces the possibility of solid buildup and obstruction. A suitable flow meter is a PRO-MASS 83 A DN4 (Endress & Hauser Canada Ltée, St. Laurent, Quebec, Canada), having a flow tube inner diameter of 4 mm.

Between the periods of plasma operation, the suspension is continuously circulated through the recycle loop 23 to the suspension reservoir 17. By ensuring continuous flow though all wetted conduits during spraying and idle operation, sediment formation and buildup, which can cause malfunction of the valves and injector, is avoided. Multiple solenoid-valve or pneumatic valve controlled inlets and outlets to the conduits for solvents 24, pressurized air (or other propellant) 26 and drainage 25 permit a washing sequence of the conduits. Startup, shutdown, as well as solvent rinsing sequences of the conduits and injector line may be fully automated and computer controlled. The propellant (preferably a) gas 21 is delivered to the injector through an internal concentric tube. An electronic mass flow controller with a downstream backpressure regulator 22 precisely controls the gas flow rate, even at abruptly varying injector pressures, which can arise due to plasma backpressure or due to solid obstructions of the injector during the spray process.

The injector 14 will now be further described in reference to FIG. 2. The injector consists of two concentric tubes. The outer tube 30 is imbedded in a water-cooled copper divergence of the torch 10, and thereby cooled through intimate contact to the torch. The liquid suspension is delivered though the annular chamber 32, delimited by the outer tube 30 and inner tube 31. The inner tube delivers the propellant gas 33. Supplying the liquid though the outer annular passage, instead of through the central tube, provides a cross-sectional area with a higher cross-sectional perimeter available for liquid flow, thereby reducing a probability of obstruction. Should an agglomerate or buildup deposit on the inner walls of the outer tube 30, only part of the flow channel will be obstructed and the liquid can pass around the obstruction, minimally interrupting the spray process. The inner tube 31 terminates shortly before the discharge orifice at the end of the outer tube 30, creating a mixing chamber 40 for the propellant and carrier. For example, the inner tube can stop 5 to 20 mm short of the orifice. The propellant and carrier then discharge though a common restrictive orifice 34. A wall of the mixing chamber 40 preferably smoothly narrows toward the orifice 34, which is preferably conical, providing little opportunity for material deposition along the inner walls. The inner orifice diameter can vary between 0.5 mm and 1.5 mm. As the gas forces the liquid into an annular flow pattern on the wall of the mixing chamber 40 and of the orifice, the effective cross-sectional area available for liquid flow is smaller, creating higher liquid flow velocities in the axial direction. The gas flow remains in a cylindrical form throughout the orifice to define a central gas core surrounded radially by an annular sheath of the carrier. In this flow configuration a continuous delivery of the carrier through the orifice is ensured.

The high liquid velocities are also beneficial in creating shear forces along the inner walls of the orifice to avoid solid buildup. Furthermore, a short residence time of the suspension in the orifice is imparted. Since the orifice is subject to the thermal radiation and other heating mechanisms from the plasma flame, a short contact time of the liquid with the orifice walls reduces the possibility of solvent evaporation and solid buildup inside the orifice. The liquid acceleration, along with the entrainment by the propellant, allows the suspension droplets to attain sufficient momentum to enter the converging plasma streams 36. On the other hand, particles or agglomerates, which are larger that the effective cross-sectional area available for liquid flow in the orifice, can pass unhindered through the orifice without causing an obstruction. It will be appreciated that such an agglomerate can break into the gas core, with minimal affect on the delivery rates of the gas and (more critically) the suspension. Even at low liquid flow rates and large-diameter discharge orifices, a high liquid velocity can be maintained by the annular flow of this two-phase fluid injection, preventing obstructions and malfunction of the process.

It is a further preferable that the inner tube can be slid axially from and to the discharge orifice, thereby varying the volume of the mixing chamber 40. The volume in the mixing chamber 40 is an important parameter that can be controlled to maintain the annular twin-fluid flow through the orifice, and to ensure a continuous discharge, preventing periodic or pulsing discharge known as slug flow. Such problems arise for large orifice dimensions, low liquid flow rates and high liquid viscosities. A pulsing discharge would be detrimental to the spray process and the resulting coating. For the benefit of a large discharge orifice, the degree of atomization by this two-phase fluid injector into a narrow droplet size distribution is not prioritized, since all ejected droplets are entrained by the encircling high-velocity plasma streams, which shear the liquid further into a fine spray of droplets 39.

It should be pointed out here that the plasma is initiated and the plasma operating conditions established before the liquid suspension is injected. During this period, the inner wall of discharge orifice 34 is cooled by a continuous flow of the propellant 33. Without this gas flow during start-up, the arriving suspension would immediately dry out inside the orifice tube, thereby obstructing the injector. It will be appreciated that alternatively, or additionally flow of the carrier (without the particulate) or another fluid could alternatively be used while the plasma is being produced, or alternative thermal regulation can overcome this problem.

Using an outer wall 30 with an inner diameter of 2.1 mm is selected in the current embodiments, because such tube is part of the commercially available DC-plasma spraying torch, as preferred in this invention.

Any suitable propellant gas can be chosen, however nitrogen or argon are preferred since these gases are generally already composing the plasma gas. Using a thin walled stainless steel tube 33 for the propellant gas is selected in the current embodiment in order to maximize the cross-sectional areas available for fluid flow. Furthermore, a material which does not deform at moderately elevated temperatures is preferred to maintain a precise volume of the mixing chamber during operation. For example, a stainless steel tube with an inner diameter of 1.1 mm and an outer diameter of 1.55 mm can be used.

It should also be noted that the robust, blockage-resistant injector and delivery system, could also be used in an arrangement, where the suspension is radially injected into the plasma flame, external or internal to the torch. The advantages in comparison over the prior art are that the suspension droplets are injected at a high velocity to penetrate the plasma stream, even at low suspension flowrate, and the injector remains potentially blockage free. However, if the suspension is injected radially instead of axially into the converging plasma flame, a lower proportion of the suspension material will contact the flame effectively to produce high-quality nanostructured coatings.

Furthermore, the use of the propellant injector, according to this invention, is not necessary limited to suspension DC plasma spraying. It could also be implemented in single plasma stream DC torches, radio-frequency inductively coupled torches, flame spray systems and high-velocity oxy fuel (HVOF) spray systems. The advantages of using an axial feed converging DC plasma system are the complete entrainment of all suspension droplets and the favorable in-flight particle conditions.

In the practice of a method of this invention, stable and reproducible particle jet conditions are observed for long uninterrupted operating periods. Furthermore, this suspension injection method, in conjunction with the axial injection converging plasma torch led to favorable in-flight particle states. In particular, high average particle velocities up to, but not limited to, 600 m/sec, at average particle temperatures above the melting point of common ceramics, are obtained. Such high values of particle velocities are uncommon in plasma spraying, and are beneficial to produce dense and nanostructured coatings. The following non-limiting examples illustrate the method for the production of nanostructured coatings. Certain mechanical and physical properties of materials exhibit remarkable improvements as their grain size is reduced to the nanometer range. Attractive features include decreased thermal diffusivity for zirconia-based thermal barrier coatings, increased ionic conductivity for solid oxide fuel cell components, and improvements in hardness and ductility for protective cermet coatings.

EXAMPLE 1

Figure 3:
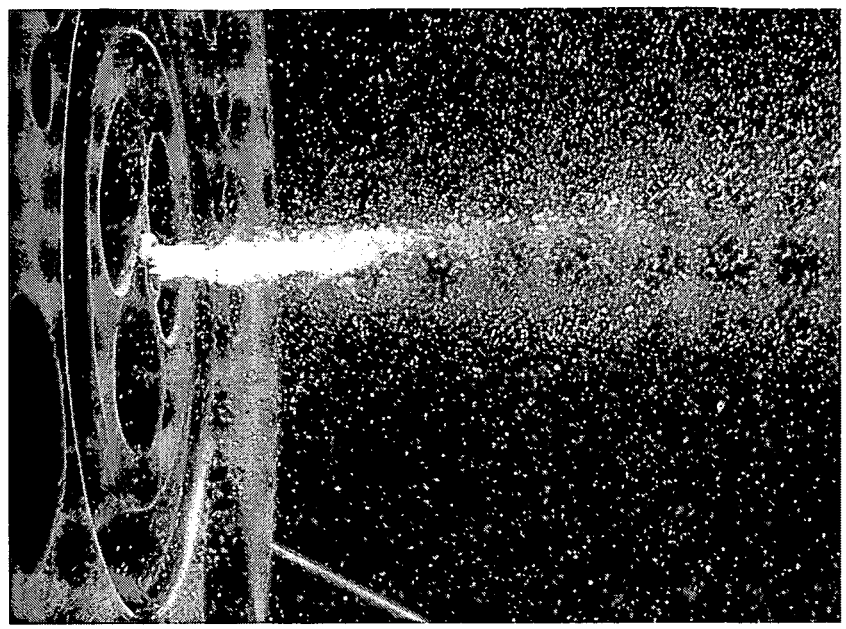
FIG. 3 is a photograph the injection plume of zirconia powder in an ethanol suspension, discharged through the injector of FIG. 2 propelled by an air stream.

In this example $Y_2O_3$—$ZrO_2$ oxide coatings, which can be applied as thermal barrier coatings (TBC) or solid oxide fuel cell (SOFC) components, were prepared on mild-steel substrates. The suspensions of 10 wt % solids in ethanol was prepared from 1.5 wt % yttria doped $ZrO_2$ powder (29-80 nm particle size), and dispersed in a two-frequency ultrasonic bath at 16 and 80 kHz, without addition of a dispersant. The suspension was injected into the spray torch a flow rate 34.7 ml/min and propelled through the injection orifice of this invention with a diameter of 0.5 mm with nitrogen gas propellant at a flowrate of 5.0 slpm. FIG. 3 shows a photograph of the suspension jet propelled through in injector orifice without the plasma. The converging nozzle was removed for this photograph. During deposition, the substrate temperature was maintained at approximately 200° C. using forced air-cooling. Experimental conditions were as following:

| | |
|---|---|
| Torch Current (3×) | 180 A |
| Total primary gas flow rate | 180 slpm |
| Argon concentration | 45% |
| Nitrogen concentration | 45% |
| Hydrogen concentration | 10% |
| Torch power | 86.3 kW |
| Torch nozzle size | 11.1 mm |
| Gun traversing speed | 600 mm/sec |

On line measurements of the particle states at the spray distance indicated an average particle velocity of 526 m/sec and a particle temperature of 2851° C. Varying torch-operating condition can control the particle velocities. Varying the suspension flowrate into the spray apparatus can control the particle temperatures.

Figure 4:
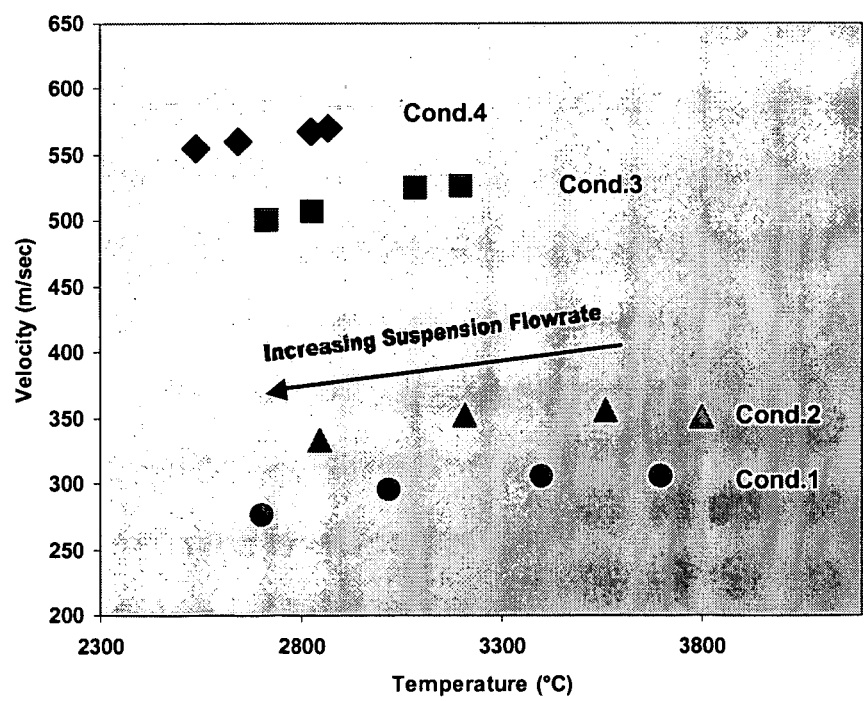
FIG. 4 is a graph of an operating space in terms of particle states for four different plasma conditions, and suspension flow rates varying between 19.3 and 48.2 ml/min, using a 10% $ZrO_2$ suspension in the production method of this invention.
Figure 5:
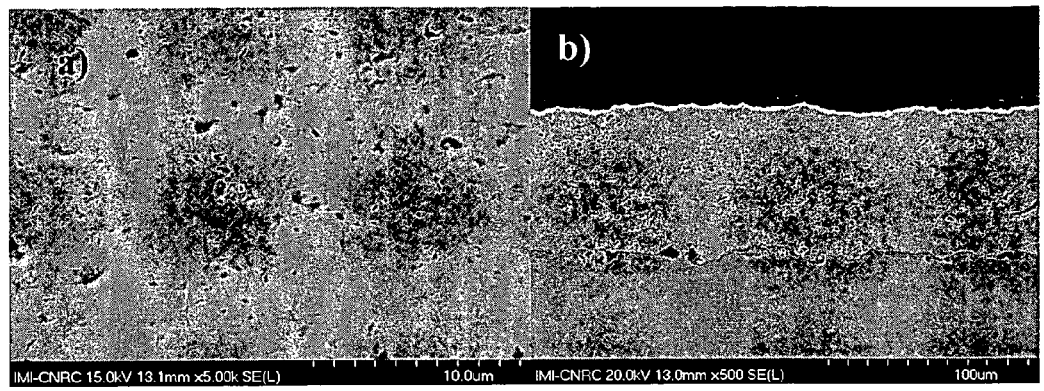
FIGS. 5 a) and b) are scanning electron micrographs of a nanostructured yttrium oxide doped zirconium oxide coating, produced by the method of this invention.

FIG. 4 illustrates an operating space in terms of particle states for four different plasma conditions and suspension flow rates varying between 19.3 and 48.2 ml/min, using a 10% $ZrO_2$ suspension and measuring at a spray distance of 63.5 mm. The coatings produced were gray in color and had a thickness of approximately 100 µm, however, much thinner coatings have also been produced. The deposition efficiency (DE), defined as the percentage of feedstock material fed into the spray apparatus that actually deposits on the sprayed part was measured as 64%. Electron microscopy on the cross section of the coatings revealed a highly dense microstructure, free of cracks and without any visible lamellar structure, as shown in FIG. 5. A pronounced lamellar structure is usually associated with thermal spray coatings by virtue of the overlapping droplets from which it is formed. A porosity of <1% was determined using image analysis on the micrograph. X-Ray diffraction (XRD) analysis indicated that the coatings consisted of monoclinic and tetragonal phases, with approximately 77% tetragonal phase. The nanostructure of the coatings was confirmed by the peak broadening of the XRD spectra, indicating a grain size of approximately 30 nm.

EXAMPLE 2

In this example, $Al_2O_3$ oxide coatings and composite coatings were prepared on mild-steel substrates. The suspensions of 10 wt % solids in ethanol are prepared from α—$Al_2O_3$ powder (29-68 nm particle size), and dispersed in an ultrasonic bath, as elaborated in Example 2. A suspension of 57 wt % $Al_2O_3$ and 43% $ZrO_2$ (1.5% Yttria) was also prepared by mixing $Al_2O_3$ and $ZrO_2$ feedstocks. At this ratio, a eutectic alloy exists. The $Al_2O_3$ and $Al_2O_3$—$ZrO_2$ suspensions were injected into the spray torch at flow rates of 35 ml/min and 34.7 ml/min, respectively. The suspensions were propelled through a 0.5 mm diameter injection orifice, using nitrogen gas at a flowrate of 5.0 slpm. For the purpose of illustration, this example uses the same spray conditions as listed in Example 1. However, the substrate temperature for the alumina coating was maintained at 400° C., and for the alumina-zirconia composite coatings at 300° C. Particle velocities around 500 m/sec and particle temperatures of 2700° C. were measured in both cases.

Experiments revealed that at particle velocities imparted using prior art, radially-injected jet sprays, which usually do not exceed 400 m/sec, the small alumina particles do not possess insufficient momentum to impact at high velocities on the substrate, thereby creating porous and non-cohesive coatings. Because of the low density of the material, the small particles follow the diverging gas stream in front of the substrate surface.

A substantial improvement was noticed using the feedstock injector for the axial converging plasma torch of the present invention. The high particle velocity at high particle temperature could partially overcome the density and size limitation to create sufficiently high impact velocities. The produced $Al_2O_3$ coatings showed a porosity of 11% and XRD measurements revealed retention of the metastable γ-phase at 88% and a grain size of 25 nm, indicating high impact velocities and a high degree of spreading and cooling of the arriving droplets.

Figure 6:
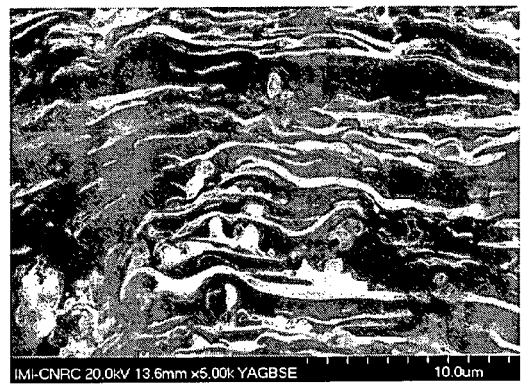
FIG. 6 is a scanning electron micrograph of a nanostructured $Al_2O_3$—$ZrO_2$ composite coating, produced by the method of this invention.

The composite coatings were produced at a deposition efficiency of 75%, higher than for $ZrO_2$ or $Al_2O_3$ alone. The porosities of approximately 1% were substantially lower than for pure alumina. The coatings consisted of thin alternating layer of $Al_2O_3$ and $ZrO_2$, with some intimate mixing in between the layers. FIG. 6 shows a micrograph of such a coating. XRD measurements revealed a grain size in the coating between 18 nm for t-$ZrO_2$ and 34 nm for γ-$Al_2O_3$. A low thermal conductivity (1.7 W/mK) was measured, which is not solely attributable to the interface resistance between the layers, but also to the existence of crystalline nano-grains, which are created by melt quenching the ceramic solution and thereby suppressing the eutectic reaction. These coatings can be used in thermal barrier applications, requiring coatings that are thinner and lighter than conventional TBC's. The continuous alumina strata could further serve as oxygen diffusion barriers.

EXAMPLE 3

In this example, samarium doped ceria electrolytes for an intermediate temperature solid-oxide fuel cell (SOFC) were produced. SOFC electrolytes are traditionally made of yttria-stabilized zirconia (YSZ) and operate at high temperatures, typically around 900-1000° C. Reducing the operating temperature can significantly decrease the component cost. This would drastically lower the material costs for components like interconnects and insulation. New materials, such as gadolinium or samarium-doped ceria ceramics (CGO or SDC) have higher conductivity at lower temperatures. Furthermore, a thin and nanostructured electrolyte layer can compensate for the reduction of ionic conductivity at lower temperatures by decreasing the traveling distance for oxygen ions and enhancing the mobility of the ions along the grain boundaries. In contrast to traditional processes, such chemical vapor deposition (CVD), physical vapor deposition (PVD) and casting, plasma spraying is highly cost-effective and does not necessarily require post-deposition heat treatments.

The suspensions of 5 wt % solids in ethanol was prepared from samarium doped $CeO_2$ powder (20 nm particle size), and dispersed in an ultrasonic bath. The suspension was injected into the spray torch a flow rate of 34.5 ml/min and propelled through the injection orifice of this invention with a diameter of 0.5 mm, using nitrogen gas at a flowrate of 5.0 slpm. The coatings were produced on a special stainless steel material, developed as interconnects for SOFC's. The substrate temperature was maintained at approximately 500-700° C. using forced-air cooling. Experimental conditions were as following:

| | |
|---|---|
| Torch Current (3×) | 200 A |
| Total primary gas flow rate | 275 slpm |
| Argon concentration | 75% |
| Nitrogen concentration | 10% |

-continued

| | |
|---|---|
| Hydrogen concentration | 15% |
| Torch power | 82 kW |
| Torch nozzle size | 11.1 mm |
| Gun traversing speed | 600 mm/sec |

Figure 7:
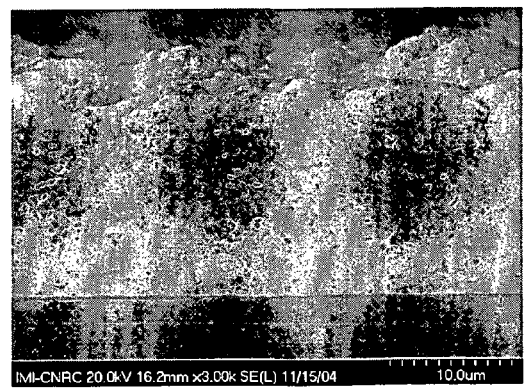
FIG. 7 is a scanning electron micrograph of a nanostructured samarium doped ceria coating as a solid oxide fuel cell component, produced by the method of this invention.

These operating conditions generated particle velocities in excess of 500 m/sec, made possible by the injection system and torch configuration of this invention. The produced coatings had a thickness of approximately 20 μm. High-resolution electron microscopy on the cross section of the coatings revealed a highly dense microstructure, free of cracks and without any visible lamellar structure, as shown in FIG. 7. X-Ray diffraction (XRD) analysis indicated that the coatings did not contain any phases that were not present in the feedstock. Grain sizes in the coatings were measured to be below 50 nm. Due to the injection scheme and torch configuration of this invention, thin and dense electrolyte layers of doped ceria, and also porous anode layers, such as nickel oxide samarium doped ceria, as well as cathode layers, such as lanthanum strontium magnesium oxide layers can consecutively be deposited to form a complete solid oxide fuel cell. The plasma spraying process of this invention would be highly economical for the production of next generation intermediate-temperature SOFC's.

EXAMPLE 4

In this example, submicron nanostructured tungsten carbide with cobalt (WC/Co) coatings are produced, which showed a surface roughness significantly lower than conventionally produced tungsten carbide coatings. This low surface roughness eliminates the need for post-machining of an abrasion resistant coating on a part. It will be appreciated that machining significantly increases the production costs. The suspensions of 10 wt % solids in 65 wt % ethanol and 25 wt % ethylene glycol are prepared from ball-milled WC 12 wt % Co powder (60-200 nm particle size), using a polyethylene imine (PEI) dispersant at a pH of 9.7. The suspension was injected into the spray torch at flow rates of 51 ml/min. The suspensions were propelled through a 1.5 mm diameter injection orifice, using nitrogen gas at a flow rate of 8.0 slpm. The stainless steel substrate temperature was maintained at 250-300° C. This example uses the same spray conditions as listed in Example 3. Particle velocities around 600 m/sec and particle temperatures of 2200° C. were measured. At this high particle velocity, which is beneficial for creating dense coatings, precise control of the flow rate provided by the two-phase injector, make it possible to maintain low in-flight particle temperatures to minimize the degree of degradation of the carbide phase in the coatings.

While preferred embodiments have been shown and described, various modifications and substitutions may be made without departing from the spirit and scope of the invention. Accordingly, it is to be understood that the present invention has been described by way of illustrations and not limitations.

REFERENCES CITED

U.S. Patent Documents

| | | |
|---|---|---|
| 6,447,848 B1 | 9/2002 | Chow et al. |
| 5,556,558 | 9/1996 | Ross et al. |

-continued

| | | |
|---|---|---|
| 5,008,551 | 4/1991 | Ross et al. |
| 5,225,652 | 7/1993 | Landes |
| 4,982,067 | 1/1991 | Marantz et al. |
| 6,669,106 B2 | 12/2003 | Delcea |
| 6,579,573 B2 | 6/2003 | Strutt et al. |
| 6,491,967 B1 | 12/2002 | Corderman et al. |
| 5,609,921 | 3/1997 | Gitzhofer et al. |

Other Publications

Karthikeyan, J. et al: "Nanomaterial deposits formed by dc plasma spraying of liquid feedstocks", Journal of the American Ceramic Society, Vol. 81, No. 1, 1998, pp. 121-128.

Fauchais, P.: Understanding plasma spraying, J. Phys. D: Appl. Phys. 37 (2004) R86-R108.

Blazdell, P., S. Kuroda: Plasma spraying of submicron ceramic suspensions using a continuous ink jet printer. Surface and Coatings Technolgy 123 (2000) pp. 239/46

Delbos C., Fazzilleau, J., Rat, V. Couder J. F., Fauchais, P.: Finely structured ceramic coatings elaborated by liquid suspension injection in a DC plasma jet, Proc. of ISTC 2004 (pdf.file), Osaka, Japan; DVS, Düsseldorf, Germany.

Fazilleau, J., C. Delbos, M. Violier, J.-F. Codert, P. Fauchais, L. Bianchi, K. Wittman-Ténèze: Influence of substrate temperature on formation of micrometric splats obtained by plasma spraying liquid suspension", Thermal spray 2003 (2003), ASM International, Materials Park, Ohio, pp. 889-893

Wittman, K., F. Blein, J. F. Coudert, P. Fauchais: Control of the injection of an alumina suspension containing nanograins in a DC plasma. Thermal Spray 2001 (2001) ASM International, Materials Park, Ohio, pp. 375/82.

Siegert R., J.-E. Döring, J.-L. Marqueés, R. Vaβen, D. Sebold, D. Stöver: Denser ceramic coatings obtained by the optimization of the suspension plasma spraying technique, Proc. of ISTC 2004 (pdf.file), Osaka, Japan; DVS, Düsseldorf, Germany.

Jordan E. H., L. Xie, X. Ma, M. Gell, N. P. Padture, B. Cetegen, A. Ozturk, J. Rogh, T. D. Xiao, T. E. C. Bryant: Superior thermal barrier coatings using solution precursor plasma spray; Journal of Thermal Spray Technology, Vol. 13 (2004) (1) p. 57-65.

Ma, X. Q., Roth, j., Xiao, T. D., Gell, M.: Study of unique microstructure in SPS ceramic nanocoatings: Proc. of ITSC 2003, Orlando, Fla., USA, pp. 1471-1476.

Boyer, E., F. Gitzhofer, M. I. Boulos: Suspension plasma spraying of hydroxyapatite powder preparation by rf plasma, IEEE Transaction on Plasma Science, Vol. 25, No. 5, Oct. 1997, pp. 1066-1072.

What is claimed is:

1. A method for injecting a fine powder suspension into a plasma for plasma spraying, the method comprising:
   a. supplying the fine powder suspension in a suspension supply tube;
   b. providing a propellant in a propellant supply tube, the propellant supply tube being contained within the suspension supply tube, at least proximate an end of the propellant supply tube;
   c. ejecting the propellant with the suspension into a plume of a thermal spray apparatus, so that the propellant occupies a core and the suspension occupies an annular sheath disposed radially about the core.

2. The method of claim 1 wherein ejecting comprises injecting the propellant axially the thermal spray.

3. The method of claim 1, further comprising controlling supply of the fine powder suspension, by:
   d. adding a nano-scale powder to a liquid carrier:
   e. dispersing the nano-scale powder within the carrier; and
   f. controlling supply of the carrier to the suspension supply tube.

4. The method of claim 3 wherein controlling supply of the carrier comprises pumping the carrier to the suspension supply tube.

5. The method of claim 4 wherein pumping comprises providing computerized control of a progressing-cavity positive-displacement pump.

6. The method of claim 5 wherein a computer monitors the controlled supply by a Coriolis flowmeter.

7. The method of claim 1, further comprising controlling supply of the propellant by measuring a flowrate of a gas, and controlling a valve to maintain a preferred flowrate.

8. The method of claim 1 wherein mixing the propellant and the suspension comprises providing a variable volume mixing chamber at an opening of the propellant supply tube.

9. The method of claim 1, wherein supplying the fine powder suspension comprises supplying a nanoscale powder of a given composition and operating the torch to produce thin nanostructured intermediate-temperature solid-oxide-fuel-cell components, such as an electrolyte and an electrode.

10. The method of claim 1, wherein supplying the fine powder suspension comprises supplying a nanoscale powder of a given composition of yttria stabilized zirconia, yttria stabilized zirconia, or alumina composites to produce a thermal barrier coating.

11. The method of claim 1, wherein supplying the fine powder suspension comprises supplying a nanoscale powder of a given cermet composition containing tungsten carbide (WC) and cobalt (Co) to produce a protective coating.

12. The method of claim 1, wherein supplying the fine powder suspension comprises supplying a nanoscale powder of a given composition containing titanium dioxide ($TiO_2$) to produce a photocatalytic coating.

13. A fine particle liquid suspension feedstock injector for axial injection of feedstock into the center of a plume of an air thermal spray system, comprising:
   g. a central propellant tube;
   h. an annular feedstock passage encasing the gas propellant tube; and
   i. a common injection orifice, though which the feedstock and propellant is forced, the feedstock being delivered in an annular flow pattern,
   the annular flow pattern being of constricted cross-sectional area defined between a wall of the orifice and a core of the propellant permitting a constant, high velocity, low volume delivery of the feedstock.

14. An injector according to claim 13 wherein the central propellant tube terminates within the annular feed stock passage at a variable distance from the common injection orifice providing a mixing chamber of variable volume.

15. An injector according to claim 13 wherein the thermal spray system comprises a plurality of converging plasma plumes, and the propellant is continuously flowing to additionally provide a coolant for the feedstock.

16. A liquid suspension feedstock delivery system for the injector according to claim 13, for supplying precise flowrates of the feedstock, the delivery system comprising:
   j. a delivery pump coupled to the feedstock passage;
   k. a precision mass flow meter for measuring a flowrate of the feedstock;

l. a recycle loop for recycling feedstock through the delivery pump, mass flow meter, and fluid control system connected to the feedstock passage when in the spraying and idle states.

17. The delivery system according to claim 16 further comprising a reservoir and an agitator that continuously agitates particles suspended in a carrier to produce the feedstock.

18. The delivery system according to claim 16 further comprising a pump for pumping the carrier to the suspension supply tube.

19. The delivery system according to claim 18 wherein the pump comprises a progressing-cavity positive-displacement pump.

20. The delivery system according to claim 18 further comprising a Coriolis flowmeter for measuring a flowrate of the suspension.

21. The delivery system according to claim 16 further comprising a computer for controlling flow to the feedstock passage in spray and idle conditions.

22. An injector according to claim 13 using injection of feedstock into a plume of one of a DC-air plasma spray apparatus, a high velocity oxy fuel spray apparatus (HVOF), a flame spray apparatus, a water stabilized plasma spray apparatus (WSP); and a radio frequency inductively coupled plasma spray apparatus